(12) United States Patent
Conway et al.

(10) Patent No.: US 7,096,323 B1
(45) Date of Patent: Aug. 22, 2006

(54) COMPUTER SYSTEM WITH PROCESSOR CACHE THAT STORES REMOTE CACHE PRESENCE INFORMATION

(75) Inventors: Patrick Conway, Los Altos, CA (US); Frederick D. Weber, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 395 days.

(21) Appl. No.: 10/256,970

(22) Filed: Sep. 27, 2002

(51) Int. Cl.
*G06F 13/14* (2006.01)

(52) U.S. Cl. ............... 711/147; 711/144; 711/129; 711/130; 711/156; 709/218; 709/232

(58) Field of Classification Search ............... 711/147, 711/141, 144, 129–130, 154, 156; 709/218, 709/232
See application file for complete search history.

(56) References Cited

U.S. PATENT DOCUMENTS

| | | | |
|---|---|---|---|
| 4,905,141 A | 2/1990 | Brenza | |
| 5,197,146 A * | 3/1993 | LaFetra | 711/144 |
| 5,410,669 A | 4/1995 | Biggs et al. | |
| 5,802,600 A * | 9/1998 | Smith et al. | 711/173 |
| 5,864,671 A | 1/1999 | Hagersten et al. | |
| 5,873,117 A | 2/1999 | Hagersten et al. | |
| 5,875,464 A | 2/1999 | Kirk | |
| 6,041,376 A | 3/2000 | Gilbert et al. | |
| 6,049,476 A | 4/2000 | Laudon et al. | |
| 6,073,216 A * | 6/2000 | McDonald et al. | 711/141 |
| 6,195,728 B1 * | 2/2001 | Bordaz et al. | 711/118 |
| 6,199,147 B1 * | 3/2001 | Smith et al. | 711/156 |
| 6,226,718 B1 | 5/2001 | Carpenter et al. | |
| 6,243,794 B1 | 6/2001 | Casamatta | |
| 6,279,078 B1 | 8/2001 | Sicola et al. | |
| 6,295,598 B1 | 9/2001 | Bertoni et al. | |
| 6,434,668 B1 | 8/2002 | Arimilli et al. | |
| 6,546,429 B1 | 4/2003 | Baumgartner et al. | |
| 6,615,319 B1 * | 9/2003 | Khare et al. | 711/141 |

(Continued)

FOREIGN PATENT DOCUMENTS

EP 0908825 4/1999

OTHER PUBLICATIONS

David E. Culler, "Composing Scalability and Node Design in CC-NUMA", Spring 2999, Computer Science Division, U.C. Berkeley, 6 pgs.

(Continued)

*Primary Examiner*—Matthew Kim
*Assistant Examiner*—Hetul Patel
(74) *Attorney, Agent, or Firm*—Meyertons Hood Kivlin Kowert & Goetzel, P.C.; B. Noël Kivlin

(57) ABSTRACT

A computer system with a processor cache that stores remote cache presence information. In one embodiment, a plurality of presence vectors are stored to indicate whether particular blocks of data mapped to another node are being remotely cached. Rather than storing the presence vectors in a dedicated storage, the remote cache presence vectors may be stored in designated locations of a cache memory subsystem, such as an L2 cache, associated with a processor core. For example, a designated way of the cache memory subsystem may be allocated for storing remote cache presence vectors, while the remaining ways of the cache are used to store normal processor data. New data blocks may be remotely cached in response to evictions from the cache memory subsystem. In yet a further embodiment, additional entries of the cache memory subsystem may be used for storing directory entries to filter probe command and response traffic.

18 Claims, 14 Drawing Sheets

U.S. PATENT DOCUMENTS

| | | |
|---|---|---|
| 6,711,652 B1 | 3/2004 | Arimilli et al. |
| 6,760,809 B1 | 7/2004 | Arimilli et al. |
| 6,763,432 B1 * | 7/2004 | Charney et al. ............ 711/144 |
| 6,959,364 B1 * | 10/2005 | Safranek et al. ............ 711/146 |
| 2002/0032838 A1 | 3/2002 | Huffman et al. |
| 2002/0087778 A1 | 7/2002 | Schoinas |
| 2002/0138698 A1 | 9/2002 | Kalla |
| 2004/0030841 A1 * | 2/2004 | Nanda et al. ............... 711/144 |
| 2004/0098541 A1 | 5/2004 | Megiddo et al. |

OTHER PUBLICATIONS

Veljko Milutinovic, "Caching in Distributed Systems", IEEE, 2000, 2 pgs.

International search report application No. PCT/US 03/31020 mailed Sep. 2, 2004.

\* cited by examiner

| Command | Packet Type |
|---|---|
| ReadSized | Command |
| RdBlk | Command |
| RdBlkS | Command |
| RdBlkMod | Command |
| ChangetoDirty | Command |
| WrSized | Command/Data |
| VicBlk | Command/Data |
| Probe | Command |
| Broadcast | Command |
| ValidateBlk | Command |
| RdResponse | Response/Data |
| ProbeResp | Response |
| TgtStart | Response |
| TgtDone | Response |
| SrcDone | Response |
| MemCancel | Response |
| Nop | Info |
| Sync | Info |

Replacement sheet

Address | Tag$_{L2}$ | Index$_{L2}$ | Index$_{PV}$ | Offset |

*Fig. 16*

COMPUTER SYSTEM WITH PROCESSOR CACHE THAT STORES REMOTE CACHE PRESENCE INFORMATION

BACKGROUND OF THE INVENTION

1. Field of the Invention

This invention is related to computer systems and, more particularly, to remote caching within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various specific coherency protocols are well known. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Many coherency protocols include the use of probes to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor) to read or write the block. Each probe receiver responds to the probe, and once the probe responses are received the command may proceed to completion. The coherency point is the component responsible for maintaining coherency, e.g. a memory controller for the memory system.

Computer systems generally employ either a broadcast cache coherency protocol or a directory based cache coherency protocol. In a system employing a broadcast protocol, probes are broadcast to all processors (or cache subsystems). When a subsystem having a shared copy of data observes a probe resulting from a command for exclusive access to the block, its copy is typically invalidated. Likewise, when a subsystem that currently owns a block of data observes a probe corresponding to that block, the owning subsystem typically responds by providing the data to the requestor and invalidating its copy, if necessary.

In contrast, systems employing directory based protocols maintain a directory containing information indicating the existence of cached copies of data. Rather than unconditionally broadcasting probes, the directory information is used to determine particular subsystems (that may contain cached copies of the data) to which probes need to be conveyed in order to cause specific coherency actions. For example, the directory may contain information indicating that various subsystems contain shared copies of a block of data. In response to a command for exclusive access to that block, invalidation probes may be conveyed to the sharing subsystems. The directory may also contain information indicating subsystems that currently own particular blocks of data. Accordingly, responses to commands may additionally include probes that cause an owning subsystem to convey data to a requesting subsystem. Numerous variations of directory based cache coherency protocols are well known.

Since probes must be broadcast to all other processors in systems that employ broadcast cache coherency protocols, the bandwidth associated with the network that interconnects the processors can quickly become a limiting factor in performance, particularly for systems that employ large numbers of processors or when a large number of probes are transmitted during a short period. In such environments, systems employing directory protocols may attain overall higher performance due to lessened network traffic and the avoidance of network bandwidth bottlenecks.

While directory based systems may allow for more efficient cache coherency protocols, additional hardware is often required. The directory mechanism often includes a directory cache that may be implemented on an ASIC (Application Specific Integrated Circuit) or other semi-custom chip separate from the processor. When the directory cache is implemented on a separate chip, the overall cost of the system may increase, as well as board requirements, power consumption, and cooling requirements. On the other hand, incorporation of a directory cache on the same chip as the processor core may be undesirable, particularly for commodity microprocessors intended for use in both single processor or multiple processor systems. When used in a single processor system, the directory cache would go unused, thus wasting valuable die area and adding cost due to decreased yield.

Another technique employed in shared memory computer systems to reduce memory latency is referred to as remote caching. In a system employing remote caching, a portion of the system memory attached to one node may be allocated for caching data corresponding to memory locations mapped to another node. The benefits of remote caching may be most significant in systems where remote memory latency is much greater than local memory latency.

In a system that implements remote caching, a storage mechanism is typically employed to identify lines or blocks that are contained in the remote caches. Like the foregoing, inclusion of such functionality within an integrated circuit which is intended for deployment in single-processor environments may lead to waste of die area and increased costs.

SUMMARY OF THE INVENTION

A computer system with a processor cache that stores remote cache presence information is disclosed. In one embodiment, a plurality of presence vectors are stored to indicate whether particular blocks of data mapped to another node are being remotely cached. Rather than storing the presence vectors in a dedicated storage, the remote cache presence vectors may be stored in designated locations of a cache memory subsystem, such as an L2 cache, associated with a processor core. For example, a designated way of the cache memory subsystem may be allocated for storing remote cache presence vectors, while the remaining ways of the cache are used to store normal processor data. In one particular implementation, only clean, shared data blocks are remotely cached. New data blocks may be remotely cached in response to evictions from the cache memory subsystem. In yet a further embodiment, additional entries of the cache memory subsystem may be used for storing directory entries to filter probe command and response traffic.

By utilizing cache memory subsystem for the storage of remote cache presence information, the need for a separate directory storage may be avoided. As a result, overall cost may be reduced, as well as required board area, power consumption, and cooling requirements. In addition, embodiments are possible in which utilization of the cache memory subsystem for the storage of remote cache presence information may be selectively enabled based upon whether the subsystem is deployed in a single-processor environment or a multiple-processor environment. Thus, when deployed in a single-processor environment, the storage locations of the cache memory subsystem may be utilized exclusively for processor-caching operations, and the waste (i.e., non-utilization) of dedicated directory storage may be avoided.

BRIEF DESCRIPTION OF THE DRAWINGS

Other objects and advantages of the invention will become apparent upon reading the following detailed description and upon reference to the accompanying drawings in which:

FIG. 16 illustrates an alternative format for indexing a given presence bit.

Figure 1:
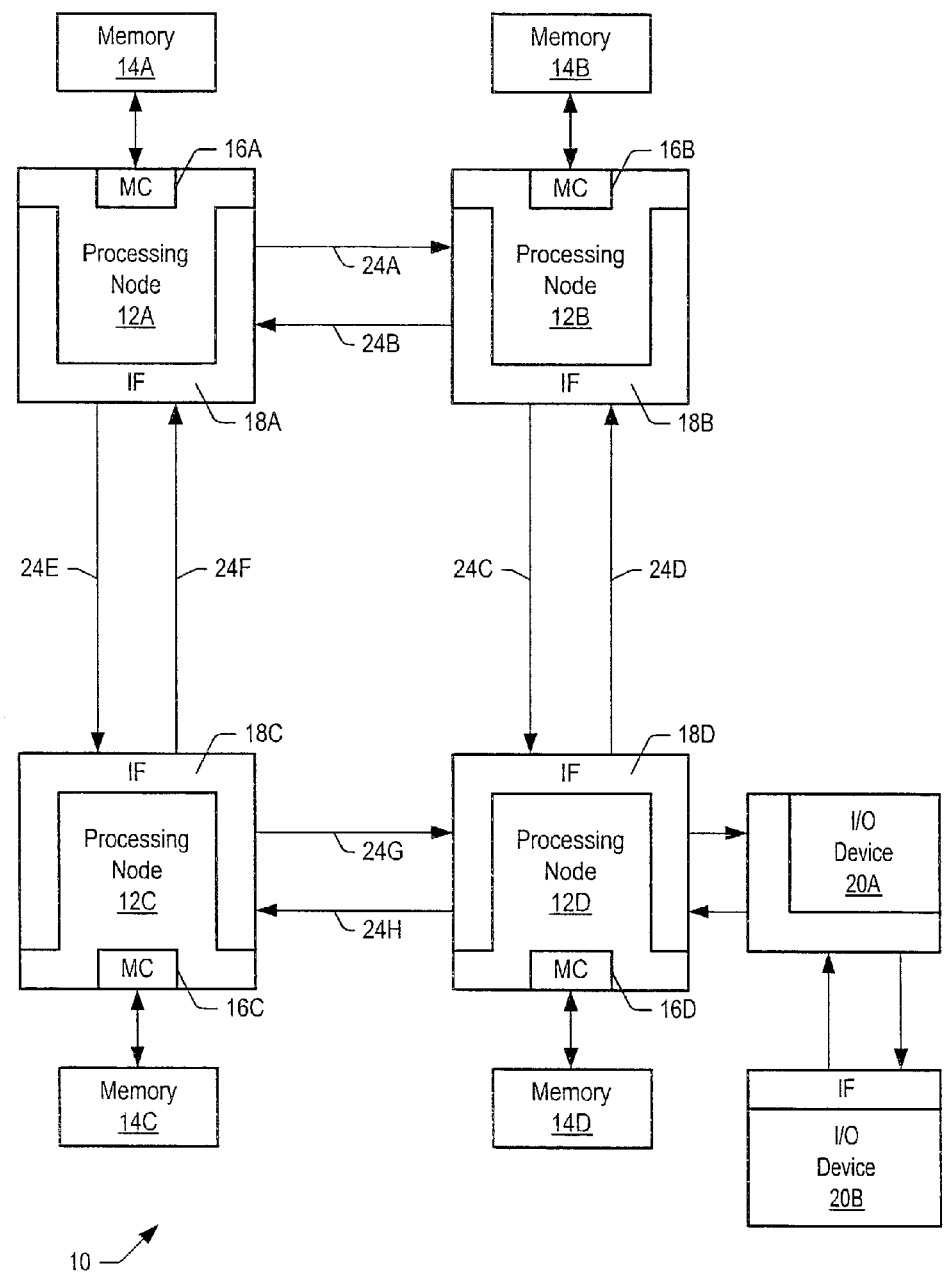
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, one embodiment of a computer system 10 is shown. Computer system 10 includes a plurality of processing nodes 12A, 12B, 12C, and 12D. Each processing node is coupled to a respective memory 14A–14D via a respective memory controller 16A–16D. Additionally, each processing node 12A–12D includes interface logic 18A–18D used to communicate with others of the processing nodes 12A–12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 1, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes or in a non-coherent fashion as a daisy-chain structure between I/O devices 20A–20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes than the embodiment shown in FIG. 1. In addition, other embodiments are possible in which each processing node is coupled to every other processing node through a point-to-point network.

In addition to the depicted memory controller and interface logic, each processing node 12A–12D may include one or more processors and associated caches, as described further below. Broadly speaking, a processing node comprises at least one processor and may optionally include a memory controller for communicating with a memory and other logic, as desired.

Memories 14A–14D may comprise any suitable memory devices. For example, a memory 14A–14D may comprise one or more RAMBUS DRAMs (RDRAMs), synchronous DRAMs (SDRAMs), DRAM, static RAM, etc. The address space of computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. Memory controllers 16A–16D may comprise control circuitry for interfacing to memories 14A–14D. Additionally, memory controllers 16A–16D may include request queues for queuing memory requests.

Generally, interface logic 18A–18D may comprise buffers for receiving packets from the link and for buffering packets to be transmitted upon the link. Computer system 10 may employ any suitable flow control mechanism for transmitting packets.

I/O devices 20A–20B are illustrative of any desired peripheral devices. For example, I/O devices 20A–20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Figure 2:
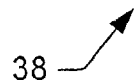
FIG. 2 is a table illustrating one embodiment of packet definitions.

Communications between processing nodes 12A–12D of computer system 10 may be accommodated using various specific packet-based messaging, as desired. FIG. 2 is a table 38 illustrating an exemplary set of packet-based messages employed according to one embodiment of the coherent link within computer system 10. Other embodiments are possible and contemplated, including embodiments employing other suitable packet definitions, or embodiments that employ bus based communication mechanisms.

As illustrated in FIG. 2, a read transaction may be initiated using one of the ReadSized, RdBlk, RdBlkS or RdBlkMod commands. The ReadSized command may be used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. In general, the appropriate read command is transmitted from the source initiating the transaction to a target node which owns the memory corresponding to the block. The target node may transmit Probe commands to the other nodes in the system to maintain coherency. In some instances, the probe commands result in changes to the state of the block in certain nodes and an updated copy of the block, if present, to be sent to the source node. Each node receiving a Probe command transmits a ProbeResp response packet to the source node. If a probed node has an updated copy of the read data (i.e. dirty data), that node transmits a RdResponse response packet and the dirty data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction. A node transmitting dirty data may also transmit a MemCancel response packet to the target node in an attempt to cancel transmission by the target node of the requested read data.

A write transaction may be initiated using a WrSized or VicBlk command followed by a corresponding data packet. The WrSized command may be used for non-cacheable writes or writes of data other than a block in size. To maintain coherency for WrSized commands, the target node may transmit Probe commands to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block. No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e.g., the broadcast command may be used to distribute interrupts). Finally, the sync info packet may be used for cases in which synchronization of the fabric is desired (e.g. error detection, reset, initialization, etc.). It is noted that in other embodiments, other types of commands and associated coherency protocols may be employed, as desired.

Figure 3:
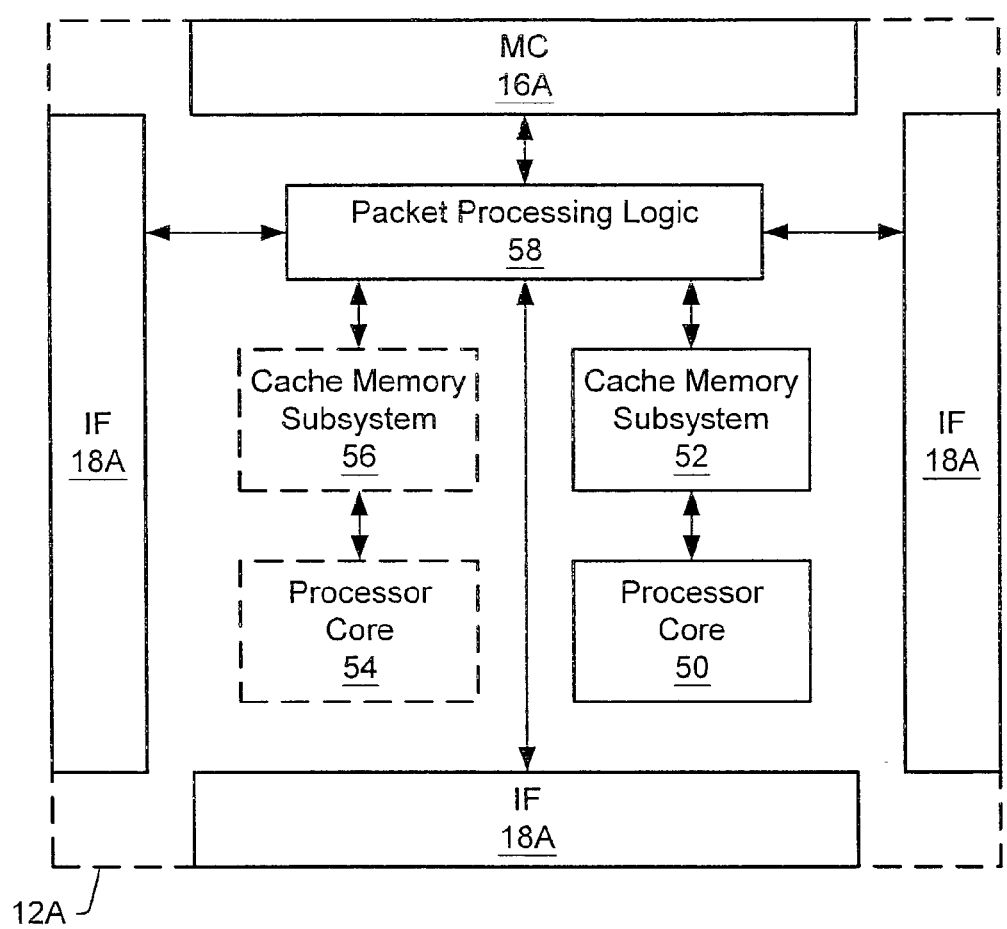
FIG. 3 is a block diagram of one embodiment of a processing node.

Turning next to FIG. 3, a block diagram of one embodiment of an exemplary processing node 12A is shown. Circuit portions that correspond to those of FIG. 1 are numbered identically. Processing node 12A includes memory controller 16A, interface logic 18A, a processor core 50, a cache memory subsystem 52 and packet processing logic 58. Processing node 12A may also include one or more additional processor cores 54 and cache memory subsystems 56, as desired. In one embodiment, the illustrated functionality of processing node 12A is incorporated upon a single integrated circuit. Processing nodes 12B–12D may be configured similarly.

Generally, packet processing logic 58 is configured to respond to control packets received on the links to which processing node 12A is coupled, to generate control packets in response to processor cores 50 and 54 and/or cache memory subsystems 52 and 56, to generate probe commands and response packets in response to transactions selected by memory controller 16A for service, and to route packets for which node 12A is an intermediate node to other nodes through interface logic 18A. Interface logic 18A may include logic to receive packets and synchronize the packets to an internal clock used by packet processing logic 58.

Cache subsystems 52 and 56 comprise high speed cache memories configured to store blocks of data. Cache memory subsystems 52 and 56 may be integrated within respective processor cores 50 and 54. Alternatively, cache memory subsystems 52 and 56 may be coupled to processor cores 52 and 56 in a backside cache configuration or an in-line configuration, as desired. Still further, cache memory subsystems 52 and 56 may be implemented as a hierarchy of caches. Caches which are nearer processor cores 50 and 54 (within the hierarchy) may be integrated into processor cores 50 and 54, if desired. In one embodiment, cache memory subsystems 52 and 56 each represent L2 cache structures.

Processor cores 50 and 54 include circuitry for executing instructions according to a predefined instruction set. For example, the x86 instruction set architecture may be selected. Alternatively, the Alpha, PowerPC, or any other instruction set architecture may be selected. Generally, the processor core 50 and 54 access the cache memory subsystems 52 and 56, respectively, for data and instructions. If a cache miss is detected, a read request is generated and transmitted to the memory controller within the node to which the missing block is mapped.

As will be described in further detail below, in one embodiment of computer system 10, directory entries may be maintained to filter probe command and response traffic for certain transactions. Rather than storing directory entries in a dedicated directory storage, directory entries may be stored in designated locations of cache memory subsystem 52 (and cache memory subsystem 56, depending upon the implementation). In a further embodiment of computer system 10, additional locations of cache memory subsystem 52 may be used for storing remote cache presence information. By utilizing cache memory subsystem 52 for the storage of directory entries and/or remote cache presence information, the need for a separate storage may be avoided. As a result, overall cost may be reduced, as well as required board area, power consumption, and cooling requirements. In addition, embodiments are possible in which utilization of cache memory subsystem 52 for the storage of directory entries and/or remote cache presence information may be selectively enabled based upon whether the subsystem is deployed in a single-processor environment or a multiple-processor environment. Thus, when deployed in a single-processor environment, the storage locations of the cache memory subsystem may be utilized exclusively for processor-caching operations, and the waste (i.e., non-utilization) of dedicated directory storage may be avoided. Specific details regarding these features of cache memory subsystem 52 will be provided further below.

Figure 4:
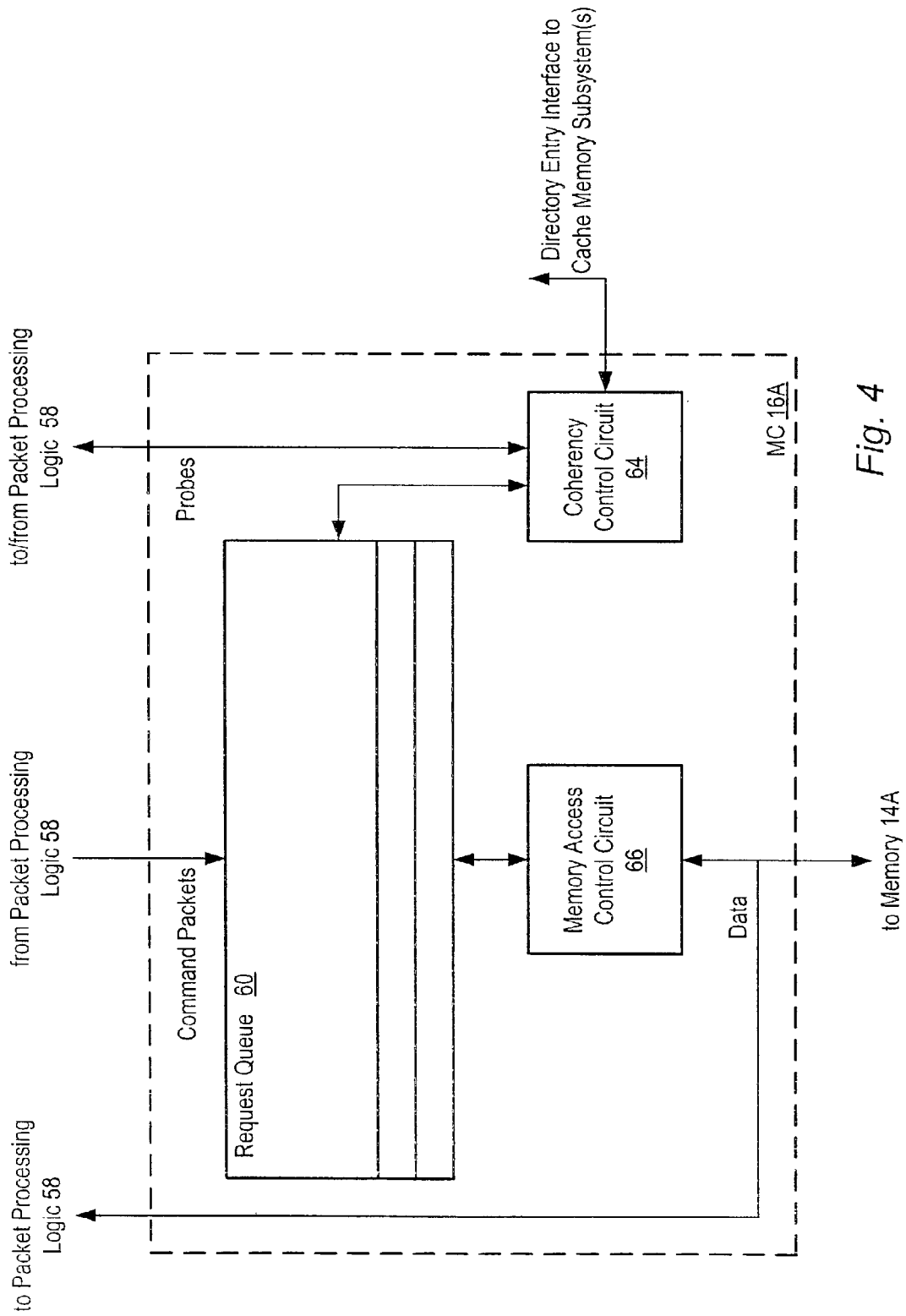
FIG. 4 is a block diagram of one embodiment of a memory controller.

Turning next to FIG. 4, a block diagram of one embodiment of memory controller 16A is shown. Memory controllers 16B–16D may be configured similarly. In the embodiment of FIG. 4, memory controller 16A includes a request queue 60, a coherency control circuit 64, and a memory access control circuit 66.

Memory controller 16A receives command packets from packet processing logic 58 into request queue 60. The command packets are routed to memory controller 16A by packet processing logic 58 if the address affected by the command corresponds to a memory location in memory 14A. In other words, if the address of the command packet addresses a block stored in memory 14A, the command packet is routed to memory controller 16A. Memory controller 16A queues the command information in request queue 60, and subsequently processes the command. Coherency control circuit 64 ensures that the command is performed in a coherent fashion. If probes are required for the command, coherency control circuit 64 transmits a probe indication to packet processing logic 58. For example, the probe indication may include the SrcNode, SrcUnit, and SrcTag from the corresponding command, the address, and the type of command. Packet processing logic 58 may transmit Probe commands in response to the probe indication. Coherency control circuit 64 may further receive SrcDone packets from packet processing logic 58, and may receive probe responses for WrSized commands. Memory access control circuit 66 may interface with memory 14A to perform commands which are committed by coherency control circuit 64 (e.g. after coherency operations have been transmitted and any responses to be received from other nodes have been received). If the command is a read, data may be returned from memory 14A to packet processing logic 58 for forwarding to the source node in a RdResponse packet.

Coherency control circuit 64 is additionally configured to maintain directory entries for certain data blocks. As discussed above, these directory entries are stored within designated locations of cache memory subsystem 52 and/or cache memory subsystem 56. For this purpose, coherency control circuit 64 may include an interface to the cache memory subsystem(s). Coherency control circuit 64 may determine if probes are required for a command based upon the type of command and based upon the presence of a directory entry for the address specified by the command. The directory entries may contain various coherency information, depending upon the implementation. For example, a directory entry may indicate the owner of a given block, whether the block is modified in a given mode, and/or the existence of nodes that have shared copies of the block. Further details regarding various exemplary directory entry formats are provided below.

Figure 5:
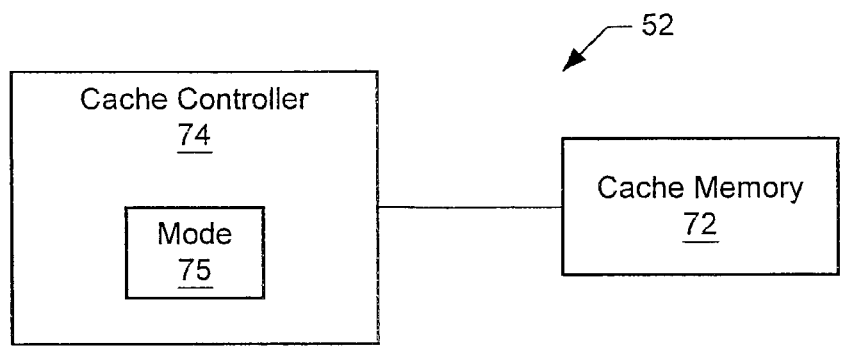
FIG. 5 is a block diagram of a cache memory subsystem.

FIG. 5 is a block diagram illustrating one embodiment of cache memory subsystem 52. The cache memory subsystem 52 includes a cache memory 72 coupled to a cache controller 74. In the depicted embodiment, cache controller 74 includes a mode storage unit 75, which may be programmably set to enable the storage of directory entries within locations of cache memory 72, as discussed below.

Figure 6:
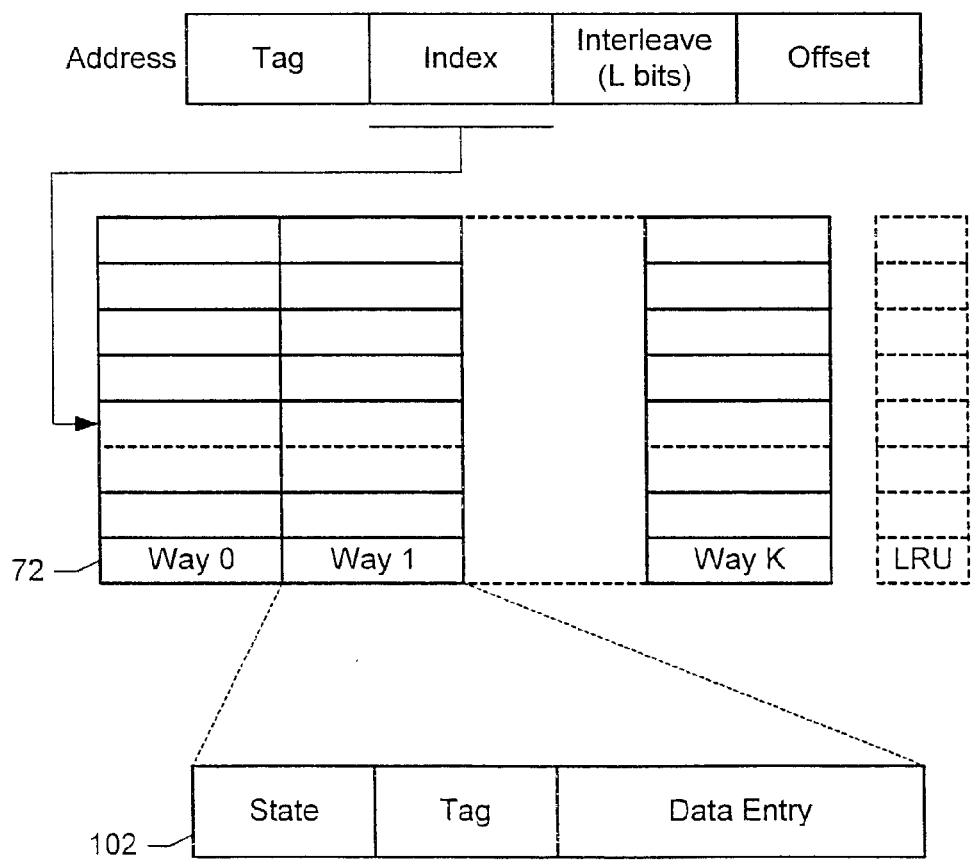
FIG. 6 illustrates one embodiment of a conventional cache arrangement.

Normal cache entries (that is, entries within cache memory 72 that store data operated upon by processor core 50) as well directory entries may be stored within cache memory 72 in a variety of specific formats, as desired. FIG. 6 illustrates one possible cache arrangement implemented as a K-way set associative cache structure with 2 interleaves. A block of storage 102 within cache memory 72 is shown with a data entry, a tag field, and a state field. In one embodiment, the data entry consists of 64 bytes of data. The state field identifies the state of the cache block, such as Modified, Owned, Exclusive, Shared, or Invalid in the MOESI protocol. In a conventional manner, a cache hit may be determined by comparing a tag field of the address used to access the cache memory with tag information stored with the cache block. A given set of blocks of the cache memory is accessed using an index portion of the address. The LRU field indicates which entry in the set has been least recently referenced, and may be used in association with the cache replacement algorithm employed by cache controller 74. The cache arrangement illustrated in FIG. 6 is conventional. It is noted that in other embodiments, cache memory 72 may be implemented using other specific cache arrangements. It is also noted that when deployed in a single processor environment, all of the storage locations of cache memory 72 may be used for normal cache entries (e.g., by setting mode storage unit 75 of cache controller 74 in a single-processor environment mode).

As stated previously, when deployed in a multiple processor environment, some of the locations of cache memory 72 may be used to store directory entries. The directory entries may be maintained and accessed by coherency control circuit 64 for controlling coherency operations.

Figure 7:
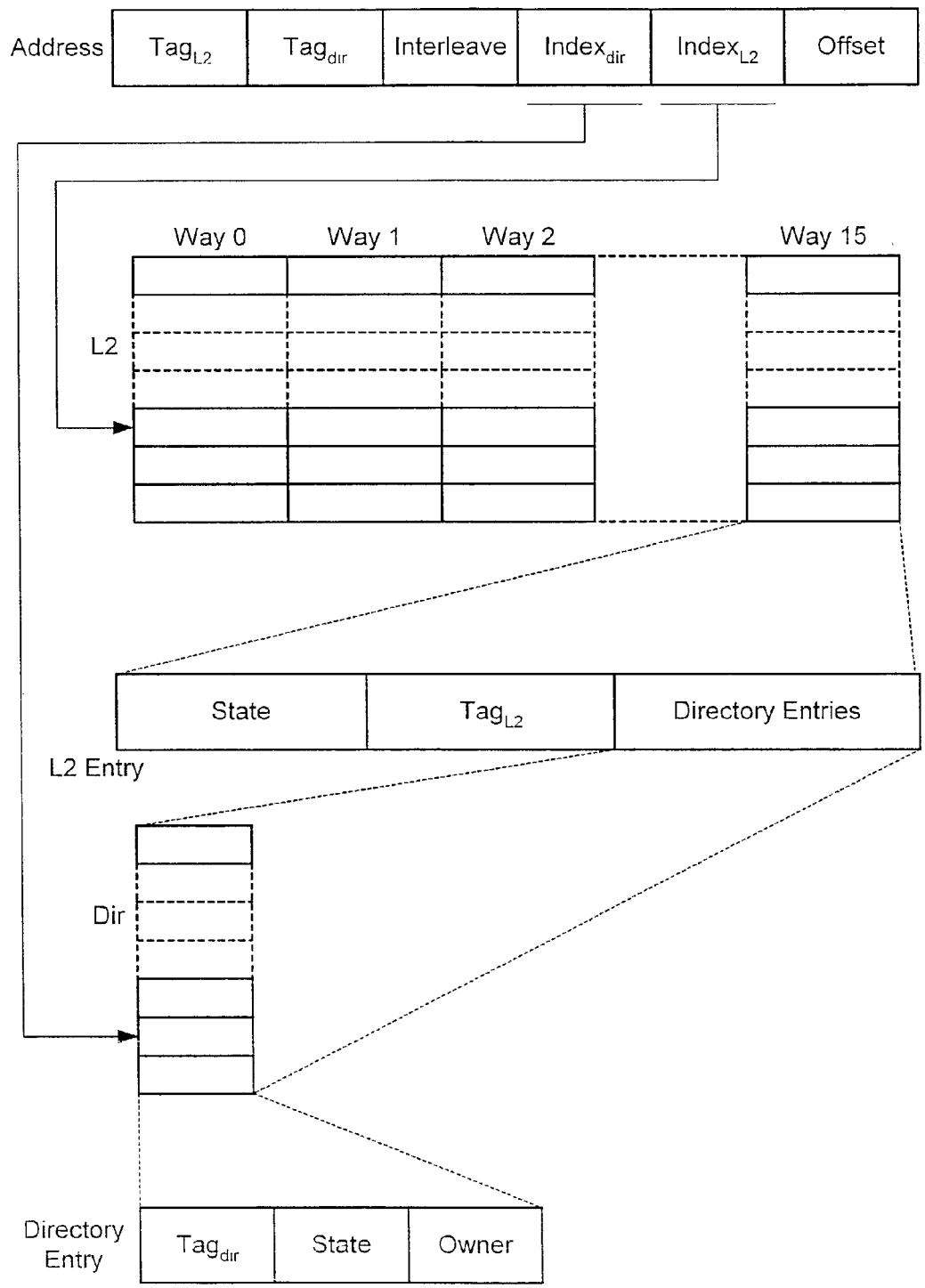
FIG. 7 illustrates a direct mapped directory cache organization.

The directory entries may be stored within cache memory 72 in various ways. For example, FIG. 7 illustrates a cache arrangement in which a designated way of cache memory 72 (e.g., way 15 in the depicted embodiment) may be used for storing directory entries. In one embodiment, this configuration may be programmably set by programming mode storage unit 75 of cache controller 74 in a multiple-processor environment mode.

The embodiment of FIG. 7 is illustrative of a direct mapped directory cache organization in which a given cache block may store a plurality of directory entries. For example, in one embodiment, each directory entry includes 16 bits, and thus a 64 byte data field in a cache block is capable of storing 32 directory entries. A given directory entry may be indexed by a directory index portion of the address used to access the cache. In one embodiment, directory entries may be interleaved across multiple cache memory subsystems (such as cache memory subsystems 52 and 56 of FIG. 3), based on selected bits of the address. A directory hit occurs when both the block tag (e.g., $Tag_{L2}$) stored with the cache block and the directory tag (e.g., $Tag_{dir}$) stored as a portion of the directory entry match corresponding tag portions of the address used to access the cache.

In one embodiment of computer system 10, directory entries are used to track blocks which are in Modified, Owned or Exclusive states. The presence of a directory entry implies that the block is cached. It is noted that the states E and M may be indistinguishable outside a processor core and corresponding cache memory subsystem since a processor may silently transition a block from Exclusive to Modified. Thus, in such an embodiment, a directory entry may include either a state O (Owned), a state ME (Modified/Exclusive) or a state I (Invalid). The absence of a directory entry implies the block is either shared or invalid in the various cache memory subsystems. It is noted that when a cache conflict miss occurs, all of the directory entries for the affected cache block must be downgraded from M, O or E state. Modified or Owned blocks are copied back to memory and transition to S state.

Figure 8:
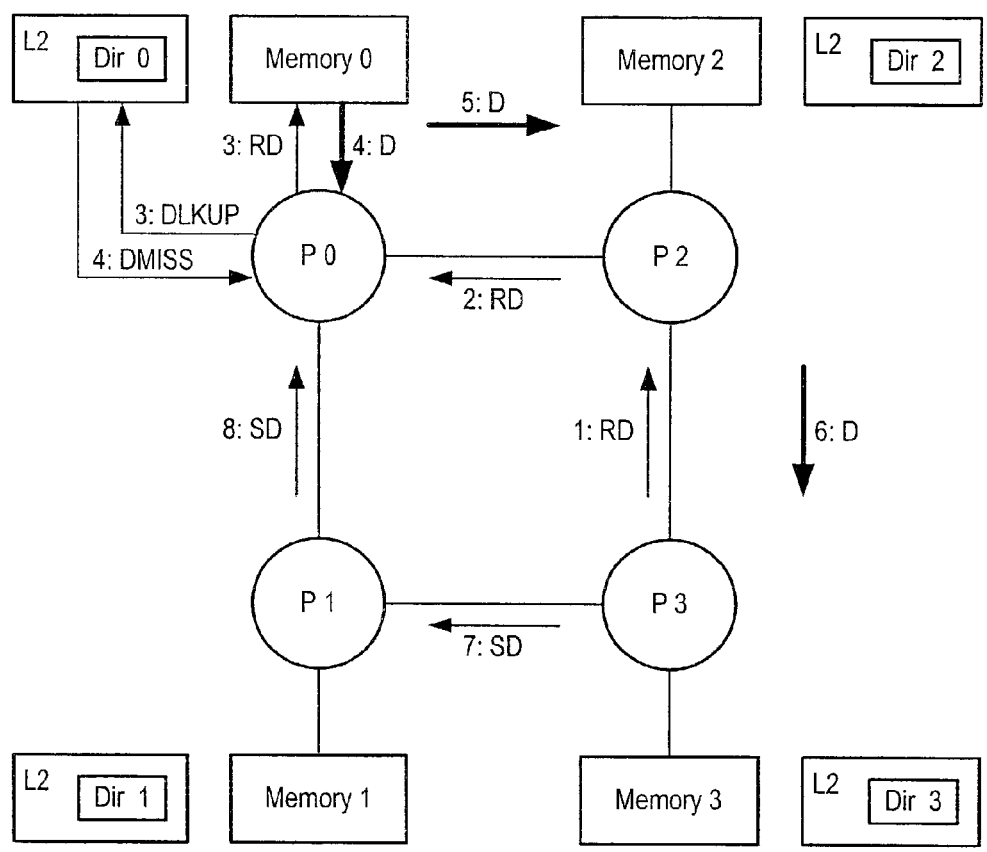
FIGS. 8 and 9 illustrate a manner in which directory entries may be utilized to filter probe command and response traffic.
Figure 9:
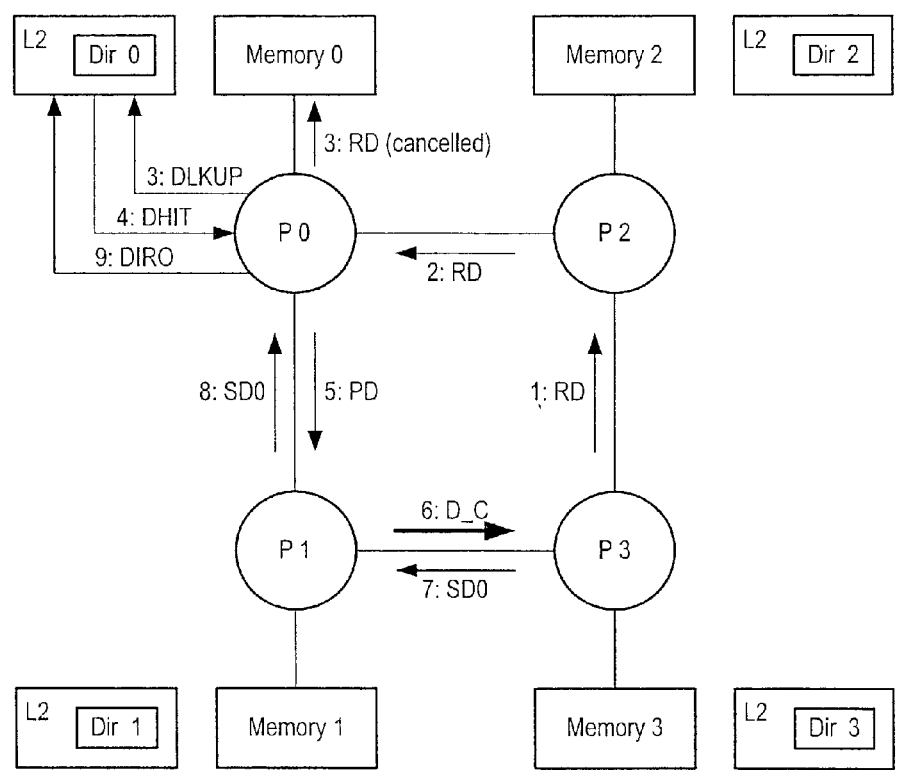

FIGS. 8 and 9 illustrate the manner in which directory entries may be utilized in one embodiment of computer system 10 to filter (or control) probe command and response traffic. In FIGS. 8 and 9, a set of processing nodes P0–P3 is shown, each of which is representative of, for example, a respective processing node 12 of FIG. 1. Each of the processing nodes P0–P3 is shown for illustrative purposes with an associated memory (memories 0–3) and L2 cache. In accordance with the previous description, each of the L2 caches is shown with a respective set of directory entries.

FIG. 8 illustrates an exemplary set of operations which may be performed in response to processing node P3 issuing a read request to a block mapped to memory 0. In this example, the read request results in the block being installed in a shared state in processing node P3. As shown, the memory request is routed to processing node P0 through processing node P2, and a directory lookup is performed by processing node P0 (e.g., by the corresponding coherency control circuit 64, FIG. 4) to determine whether a directory entry exists for the cache block in the cache memory subsystem. In the example of FIG. 8, a directory miss occurs in response to the directory lookup. Thus, since a directory entry does not exist, it is possible only that the block is Shared or Invalid in any of the processing nodes' caches. Processing node P0 therefore simply retrieves the data from memory 0, and provides the data to processing node P3 through processing node P2. When processing node P3 receives the data, a source done message may be transmitted from processing node P3 to processing node P0 through, for example, processing node P1. This completes the transaction. It is noted that in this example, since the directory lookup resulted in a directory miss, processing node P0 was not required to transmit any invalidating probes to any of the other processor nodes, which would otherwise be required in a system employing a broadcast coherency protocol.

FIG. 9 illustrates a similar example in which processing node P3 issues a read request to a block mapped to memory 0. In this example, however, when processing node P0 performs a directory lookup, a directory hit occurs in a corresponding entry of the cache memory. The directory entry indicates the block is in the ME state in processing node P1. The coherency control circuit of processing node P0 accordingly causes a probe command to be forwarded to processing node 1 to cause the processing node 1 to forward the data to processing node P3. In one embodiment, since the data is installed in processing node P3 in a shared state, the cache controller of processing node P1 will downgrade its cached copy of the block from the state M to O. The coherency control circuit of processing node P0 also updates the directory entry for the block to indicate that it is now cached in the O state in processing node P1. It is noted that in this example since a directory hit occurred for a block in the ME state, processing node P0 was not required to transmit (e.g., broadcast) invalidating probes to any of the processing nodes.

A variety of other specific coherency operations may be invoked in response to other transactions initiated by a processing node. Similar to the foregoing examples, probe command and response traffic may be filtered based upon the existence of a directory entry for a block being accessed, and/or based upon the state of the block as indicated in a directory entry. For example, referring back to FIG. 9, if processing node P3 initiates a read command to receive an exclusive copy of a particular block (e.g., by initiating a RdBklMod command), processing node P0 may forward a probe command to the processing node P1 containing a modified copy of the block. The processing node P1 correspondingly forwards the data to processing node P3. In addition, the processing node P1 may downgrade its copy to invalid, and processing node P0 may update the directory entry for the block to indicate the block is in ME state in processing node P3. Various other specific coherency operations may similarly be performed, as appropriate, depending upon the type of transaction, the existence of a directory entry, and the state of the block in the directory entry.

Many other directory entry formats are possible in other embodiments. The specific format of a directory entry may be based on the amount of state information that is kept, the scalability of the system, and the directory storage overhead, among other factors.

Figure 10:
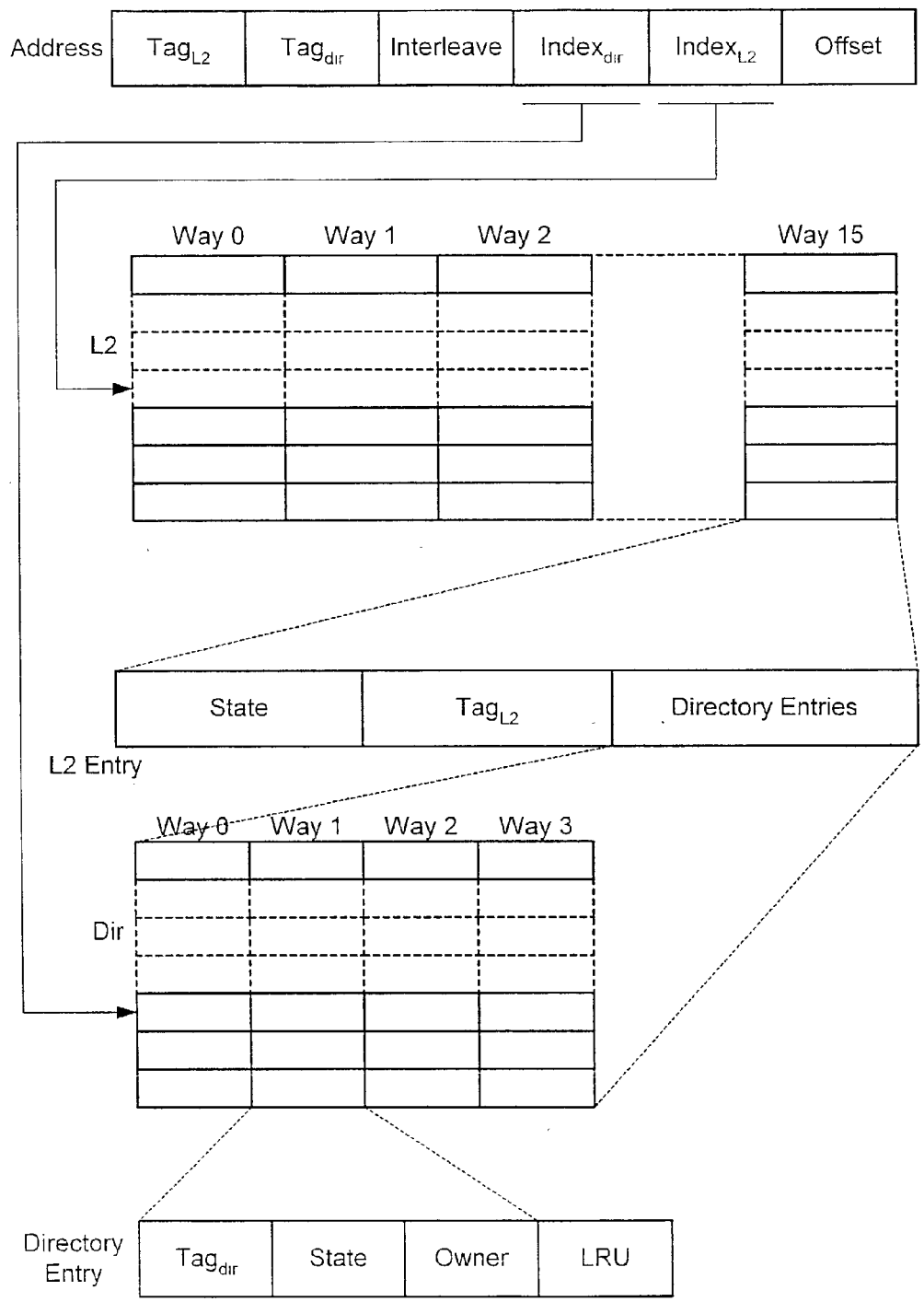
FIG. 10 illustrates a cache arrangement in which directory entries are stored using a 4-way organization.

FIG. 10 illustrates an alternative arrangement in which directory entries are stored using a 4-way cache organization. An LRU field may be maintained to determine the least recently used entry (of a set) to be replaced upon an occurrence of a directory conflict miss (i.e., when a new entry overwrites an existing entry). It is noted that when a directory conflict occurs, the coherency control circuit may invoke certain coherency activities, as needed. For example, in some situations, the cache coherency circuit may cause a node with a modified copy of the block to perform a write-back operation.

Figure 11:
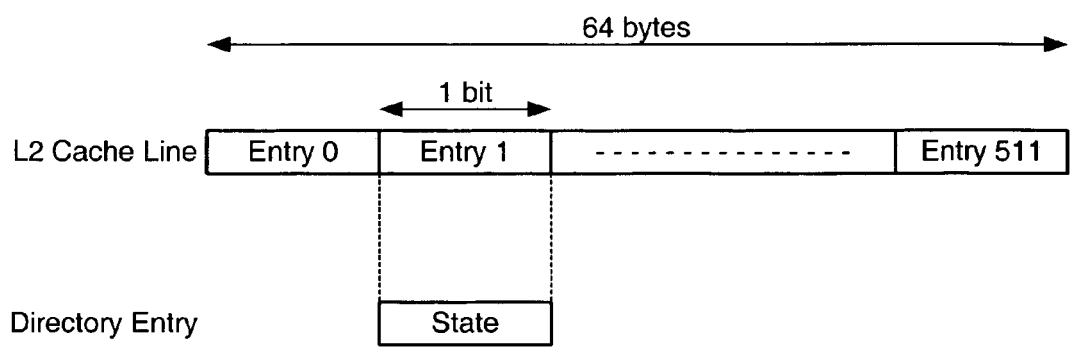
FIGS. 11 and 12 illustrate alternative directory entry formats.
Figure 12:
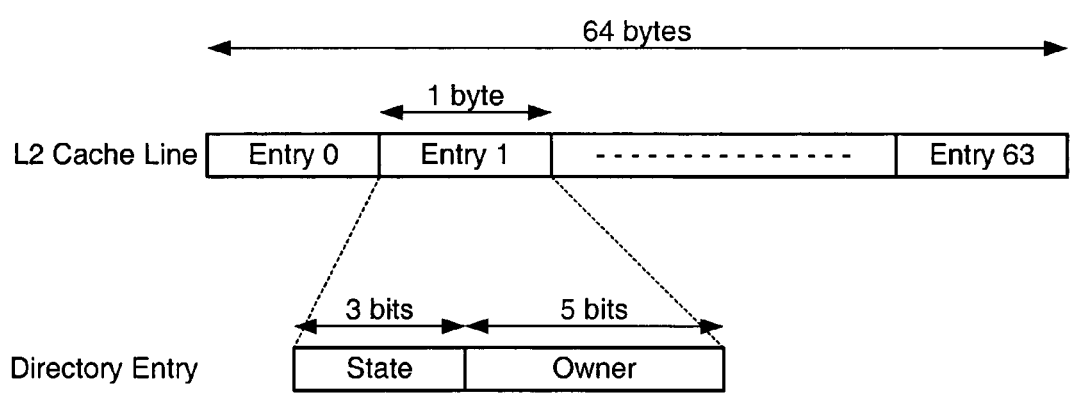

The amount of information maintained in a directory entry may also vary, depending upon the implementation. FIG. 11 illustrates an embodiment in which 512 directory entries may be provided in a 64 byte cache block. The 1 bit state field indicates if the block is in modified, owned or exclusive state (MOE). FIG. 12 illustrates an embodiment in which 64 directory entries may be provided in a 64 byte cache block. In the illustrated example, the 5 bit owner field encodes the owner for ME or O states, sufficient to support 32 processing cores (e.g., 8 nodes with 4 cores each). The directory format of FIG. 12 may be well suited for work loads in which modified blocks exhibit some page locality.

It is noted that the specific coherency activities that may be invoked (e.g, probe commands and responses) in response to a given transaction may depend upon the specific coherency scheme employed and the information contained in a corresponding directory entry, if any. Various specific directory-based protocols are possible.

In addition, it is also noted that while in the above embodiment a specific way of cache memory 72 may be used to store directory entries, other embodiments are also possible. For example, embodiments are possible in which designated sets of the cache memory 72 may be used to store directory entries or some fraction of the total entries in a way (e.g., ½) are dedicated to storing directory entries.

Still further, embodiments that do not include mode storage unit 75 are also possible. The information maintained with the cache blocks may include one or more bits that may be set to identify an entry as containing directory information.

Figure 13:
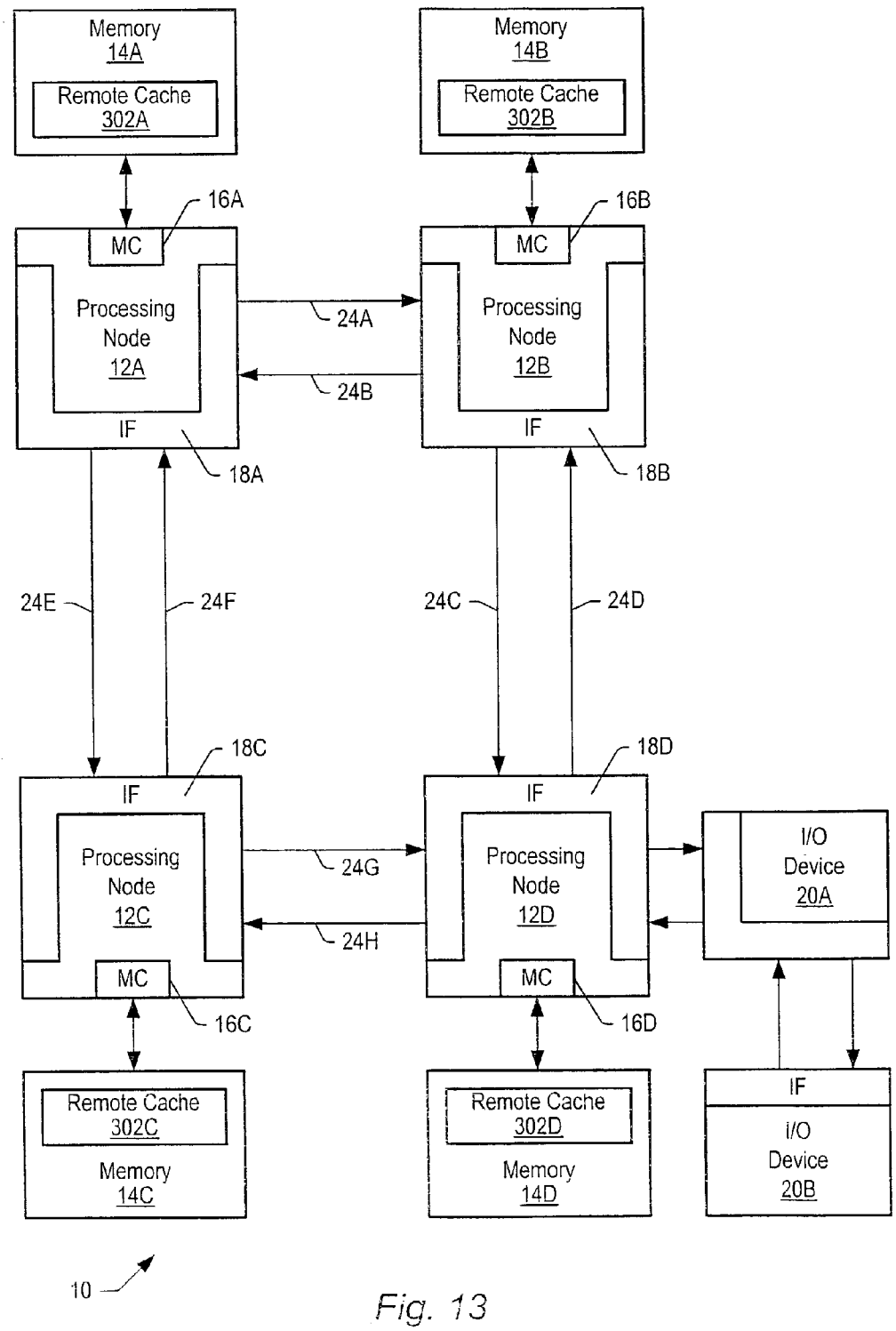
FIG. 13 illustrates another embodiment of a computer system including remote caches.

Turning next to FIG. 13, another embodiment of computer system 10 may include remote caching functionality wherein a portion of the system memory 14 (i.e., 14A–14D) of a given processing node 12 is allocated for remotely caching addresses mapped to the system memory of another node. These remote cache regions are illustrated as remote caches 302A–302D in FIG. 13. Circuit portions in FIG. 13 that correspond to those of FIG. 1 are numbered identically, and may include the same functionality as described above.

Figure 14:
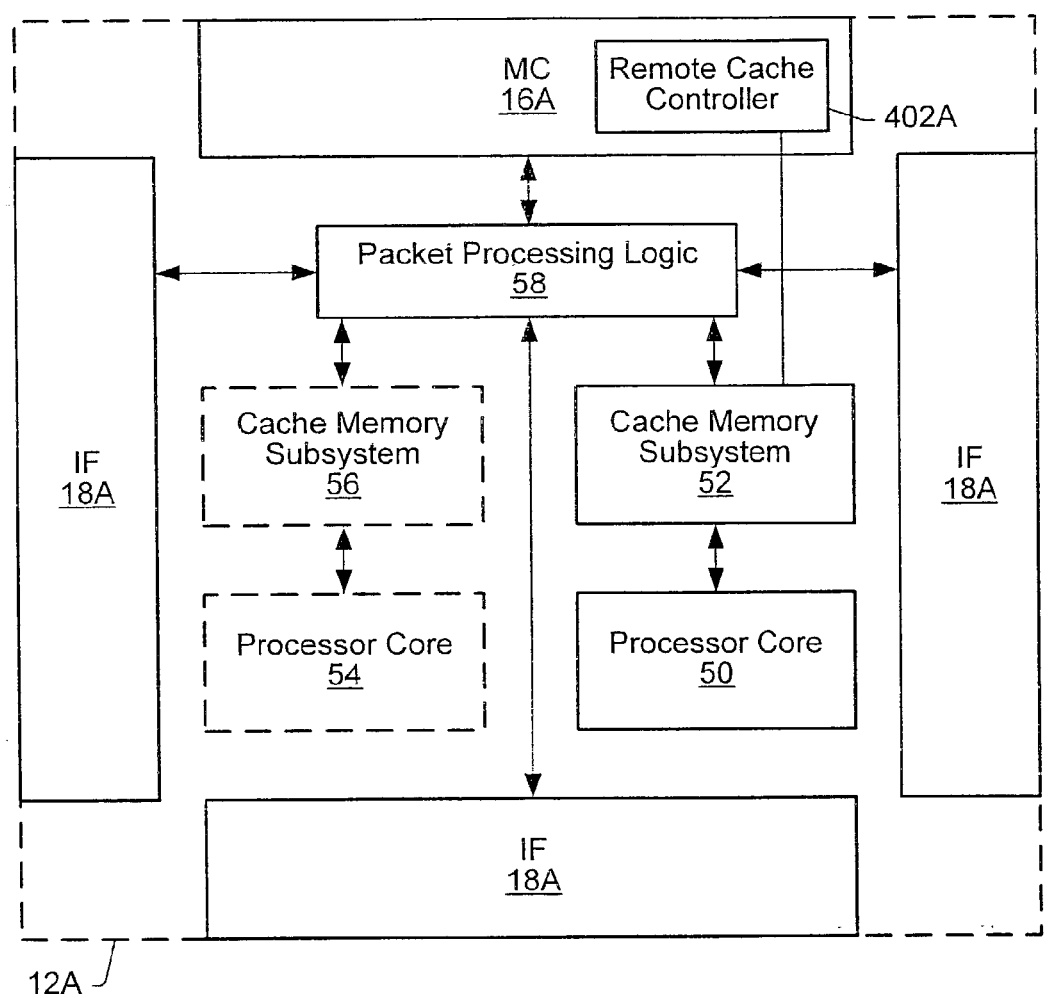
FIG. 14 is a block diagram of another embodiment of a processing node.

The storage of remote data within the remote cache 302 of a given system memory 14 may be controlled by a corresponding remote cache controller 402A, as depicted within the memory controller 16A of FIG. 14. Processing nodes 12B–12D may include similar remote cache controllers. As will be described further below, in one embodiment remote cache controller 402A may include an interface to cache memory subsystem 52 (and/or cache memory subsystem 56). Storage locations within cache memory subsystem 52 may be utilized to store information identifying whether particular addresses are remotely cached by remote cache controller 402A within the corresponding system memory 14A of the corresponding node. Further details regarding this functionality are provided below.

In one embodiment, the remote caching policy employed by remote cache controller 402A is to store only shared remote data. In such an embodiment, Modified, Owned or Exclusive data is not stored in the remote cache 302A. The remote cache 302A may be non-inclusive with respect to the cache memory subsystem 52, and may act as a victim cache for shared blocks being evicted from cache memory subsystem 52 (and cache memory subsystem 56, if desired). As such, the remote cache 302A is written to by remote cache controller 402 only when a shared remote block which is not already present in the remote cache 302A is replaced in cache memory subsystem 52 (and/or cache memory subsystem 56).

Figure 15:
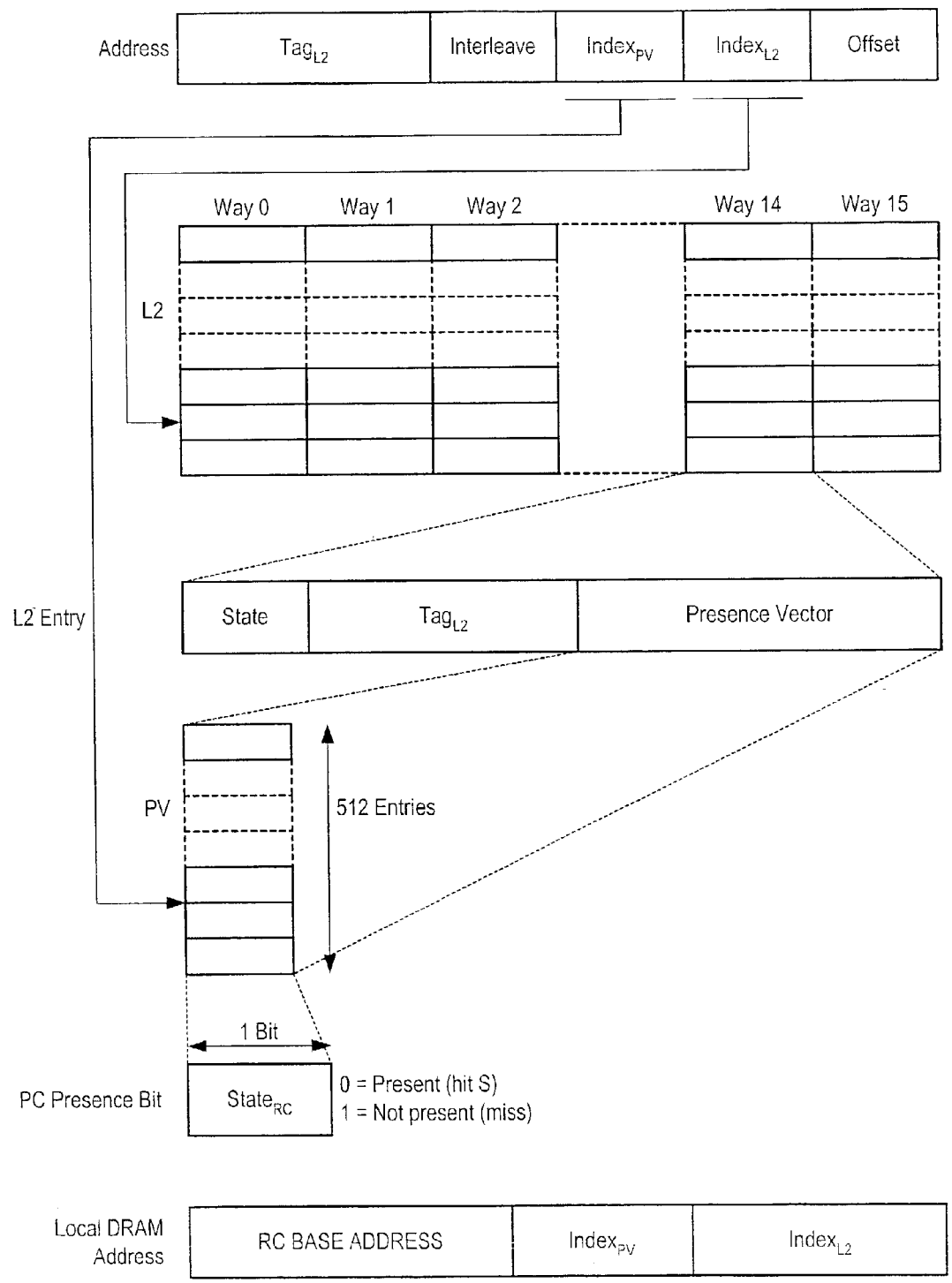
FIG. 15 illustrates an organization of a cache memory subsystem in which a designated way is used to store presence vectors.

FIG. 15 illustrates an organization of cache memory subsystem 52 in which a designated way (e.g., way 14 of the illustrated embodiment) may be used to store presence vectors that contain information identifying whether corresponding remote blocks are cached within remote cache 302. A cache block may include a presence vector including a plurality of entries, each indicating whether a corresponding block is present or not in the remote cache 302A in Shared (S) state. In the embodiment of FIG. 14, each entry consists of a single presence bit. A given presence vector may be accessed in accordance with selected index bits ($Index_{L2}$) of the address used to access the cache memory. Similarly, a presence bit of a given presence vector may be selected using other bits (e.g., $Index_{PV}$) of the address. A presence vector hit occurs when the block tag (e.g., $Tag_{L2}$) stored with the cache block matches corresponding tag bits of the address used to access the cache.

The physical addresses of system memory 14A that are allocated for remote cache 302A may be specified in accordance with an RC base address value stored in a configuration register associated with remote cache controller 402A. Remotely cached blocks within remote cache 302A of memory 14A may accordingly be addressed using the RC base address in conjunction with the bits forming the presence vector index and the L2 index, as depicted.

It is noted that in the embodiment of FIG. 14, installation of a block into remote cache 302A does not require an eviction of Modified or Owned data (or a replacement notification for exclusive data in systems with a directory). In addition, coherency state information may not be required for the remotely cached blocks since the presence bit is sufficient to indicate that a block is both valid and in a shared state. When a shared block is replaced in cache memory subsystem 52 (and cache memory subsystem 56, if desired), the block is installed in remote cache 302A if it is not already present in the remote cache. Because data in the remote cache 302A is never dirty, blocks in the remote cache 302A may be silently replaced, and remote cache evictions may be unnecessary. When another node performs a store or requests an exclusive copy of a block currently in Shared (S) state, the resulting invalidating probe command received by processing node 12A (e.g., from the home node) causes a lookup to be performed in cache memory subsystem 52 to thereby determine whether the block is present either in the remote cache 302A or in cache memory subsystem 52. If a hit occurs indicating the block is shared in either the remote cache 302A or the cache memory subsystem 52, the block is invalidated.

In some embodiments, cache memory subsystem 52 may be used both to store directory entries as described previously, as well as remote cache presence indications. For example, in one embodiment, cache memory subsystem 52 may designate one way (e.g., way 15) for the storage of directory entries (e.g., as illustrated in FIG. 7 or 10), while designating another way (e.g., way 14) for the storage of presence vectors. When used in combination, a single access to cache memory subsystem 52 can be performed to determine whether the data is cached (e.g, in ways 0–13), and whether the data is cached in the remote cache 302A. In addition, when the access is to data mapped to the local node, the access to the cache memory subsystem may additionally determine whether the data is cached in Modified, Owned or Exclusive state in another processor's cache, and if so, which node contains the data. Still further, in the case of a store (or a request from another node to receive an exclusive copy of a data block), a corresponding invalidating probe received by the processing node may result in the simultaneous invalidation of the block both in cache memory 74 (e.g., ways 0–13) and in the remote cache 302A (i.e., by changing the presence bit corresponding to the block in way 14 of the cache memory subsystem).

Figure 16:
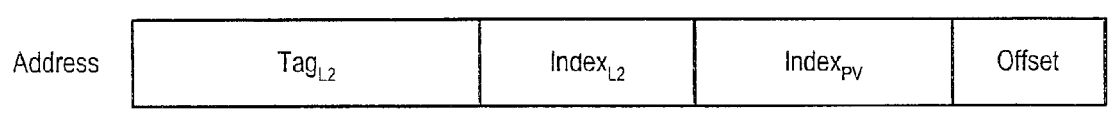

It is noted that in other embodiments, the presence information contained in cache memory subsystem 54 may be stored using other specific organizations. For example, FIG. 16 illustrates an alternative manner in which the cache memory subsystem may be indexed to access a given presence bit.

In addition, it is noted that the use of entries (e.g., a selected way) of cache memory subsystem 52 (and/or cache memory subsystem 56) for the storage of remote cache presence information may be selectively enabled based upon the operating environment. For example, a value stored in mode storage unit 75 may control whether the remote cache presence indication feature is enabled. As such, when deployed in a single-processor environment, the mode storage unit 75 may be set to designate all of the entries of the cache memory subsystem for normal caching operations, thereby avoiding waste of storage resources.

Numerous variations and modifications will become apparent to those skilled in the art once the above disclosure is fully appreciated. It is intended that the following claims be interpreted to embrace all such variations and modifications.

What is claimed is:

1. A computer system comprising:
   a first node including a processor core, a cache memory subsystem, and a first system memory; and
   a second node including a second system memory;
   wherein said first system memory includes a remote cache configured to remotely cache data that is mapped to said second system memory;
   wherein at least some cache lines within a designated way of said cache memory subsystem are configured to selectively store either processor data or remote cache presence information depending upon an operating mode of said cache memory subsystem;
   wherein said remote cache presence information includes a remote cache presence vector including a plurality of entries indexed according to a portion of a memory address used to access said cache memory subsystem, wherein each of said plurality of entries is configured to indicate whether a corresponding block of data is present within said remote cache.

2. The computer system as recited in claim 1 wherein said first node includes a remote cache controller for controlling the remote caching of said data within said first system memory.

3. The computer system as recited in claim 2 wherein said remote cache controller employs a caching policy wherein data is remotely cached in a shared state within said first system memory, and wherein data in a modified or owned state is never remotely cached within said first system memory.

4. The computer system as recited in claim 3 wherein said remote cache controller is configured to store a block of data in a shared state in said first system memory in response to a replacement of said block from said cache memory subsystem.

5. The computer system as recited in claim 4 wherein said remote cache controller is configured to remotely cache data in said first system memory only in response to replacements from said cache memory subsystem.

6. The computer system as recited in claim 5 wherein said remote cache controller is configured to store said block in said first system memory only if said block is not already remotely cached in said first system memory.

7. The computer system as recited in claim 4 wherein said cache memory subsystem is an L2 cache memory subsystem.

8. The computer system as recited in claim 1 further comprising a mode storage unit for storing a value to control whether said at least some cache lines within said designated way store processor data or remote cache presence information.

9. The computer system as recited in claim 1 wherein each of said plurality of entries of said remote cache presence vector consists of a single bit indicating whether said corresponding block of data is remotely cached in a shared state.

10. The computer system as recited in claim 1 wherein additional cache lines of said cache memory subsystem are configured to selectively store either processor data or directory information for controlling global coherence activities depending upon said operating mode of said cache memory subsystem.

11. The computer system as recited in claim 10 wherein said directory information indicates whether a cached copy of data corresponding to an address location mapped within said first system memory exists in a node.

12. The computer system as recited in claim 11 wherein said directory information indicates whether said cached copy is in a modified, exclusive or owned state.

13. The computer system as recited in claim 12 wherein a first designated way of said cache memory subsystem is selectively enabled to store said remote cache presence information and wherein a second designated way of said cache memory subsystem is selectively enabled to store said directory information.

14. The computer system as recited in claim 13 wherein said cache memory subsystem is selectively enabled based upon a value stored in a mode storage unit.

15. The computer system as recited in claim 1 wherein said designated way of said cache memory subsystem is selectively enabled to store remote cache presence information.

16. The computer system as recited in claim 15 further comprising a mode storage unit for storing a value to control whether said designated way is enabled to store processor data or remote cache presence information.

17. The computer system as recited in claim 16 wherein an additional way of said cache memory subsystem is configured to selectively store directory information for controlling global coherence activities depending upon said operating mode of said cache memory subsystem.

18. The computer system as recited in claim 1, wherein said remote cache is further configured as a victim cache of data evicted from said cache memory subsystem.

* * * * *